United States Patent [19]
Kimura et al.

[11] Patent Number: 5,744,079
[45] Date of Patent: Apr. 28, 1998

[54] PROCESS FOR PRODUCING COMPRESSION MOLDED ARTICLE OF LIGNOCELLULOSE TYPE MATERIAL

[75] Inventors: Tadashi Kimura; Toshihide Kobayashi; Katsuhiko Sakurai; Kensuke Tani, all of Yokohama; Mitsuhiro Yoshida, Kanagawa-ken, all of Japan

[73] Assignee: Nippon Polyurethane Industry Co., Ltd., Tokyo, Japan

[21] Appl. No.: 890,292

[22] Filed: Jul. 9, 1997

[51] Int. Cl.$^6$ ............................................. B27N 3/00
[52] U.S. Cl. ............................................................ 264/109
[58] Field of Search ............................................ 264/109

[56] References Cited

U.S. PATENT DOCUMENTS

| | | | |
|---|---|---|---|
| 4,609,513 | 9/1986 | Israel | 264/122 |
| 4,772,442 | 9/1988 | Trout et al. | 264/109 |
| 5,093,058 | 3/1992 | Harmon et al. | 264/115 |
| 5,188,785 | 2/1993 | Bauer et al. | 264/115 |
| 5,200,267 | 4/1993 | Bauer et al. | 428/326 |

FOREIGN PATENT DOCUMENTS

| | | |
|---|---|---|
| 2-58287 | 12/1990 | Japan . |
| 3-21321 | 3/1991 | Japan . |
| 4-232004 | 8/1992 | Japan . |

*Primary Examiner*—Mary Lynn Theisen
*Attorney, Agent, or Firm*—Fish & Richardson P.C.

[57] ABSTRACT

A process is provided for producing a compression molded article of a lignocellulose type material by use of an organic polyisocyanate compound as a binder. The process comprises carrying out adhesion by use of the following components (A) an organic polyisocyanate, (B) an aqueous emulsion of a wax having a melting point ranging from 50° C. to 160° C., and (C) an organic phosphate ester derivative and optionally (D) water. The compression molded article can readily be released from the mold, and has excellent physical properties.

8 Claims, No Drawings

PROCESS FOR PRODUCING COMPRESSION MOLDED ARTICLE OF LIGNOCELLULOSE TYPE MATERIAL

BACKGROUND OF THE INVENTION

1. Field of the Invention

The present invention relates to a process having workability for producing a compression molded article good having excellent properties such as water-resistance and humidity-resistance from a lignocellulose type material such as wood fiber by use of an organic polyisocyanate under high mold-releasing conditions.

2. Related Background Art

It has been known that organic polyisocyanate resins have excellent adhesion properties and workability as the adhesive for thermo-compression molded articles such as particle boards and medium-quality fiber boards produced from a lignocellulose type material such as wood chips, wood fibers and the articles exhibit excellent physical properties. However, the excellent adhesiveness of the organic polyisocyanate resins causes disadvantage that the compression molded article adheres firmly to the contacting metal surface of the heating plate in a continuous or batch thermo-compression process.

To solve the disadvantages of the undesired adhesion to the heating plate, it is required that a releasing agent is preliminarily sprayed onto the heating plate surface to form a releasing layer.

Japanese Patent Publication No. 3-21321 discloses a method different from the external releasing agent spray, in which a mixture of an organic polyisocyanate and a mineral wax is sprayed, prior to the thermo-compression molding, onto the lignocellulose type material to obtain releasability. In this method, however, a larger amount of the mineral wax should be added to the mixture in order to achieve satisfactory mold-releasing effect, so that this method is costly and can not be applied to practical production process without modification.

Japanese Patent Laid-open Application No. 4-232004 discloses a method of thermo-compression molding of a lignocellulose type material by addition of a neutral orthophosphate ester as a compatibilizing agent the wax and the polyisocyanate. This method involves the problem that the liquid mixture of the wax and the neutral orthophosphate ester, which is readily handleable at ordinary temperature, can not be obtained.

It has been found by the inventors of the present invention that the wax emulsified preliminarily in an aqueous medium can readily be dispersed uniformly in an organic phosphate ester deviative and the resulting mixture is readily handleable in a liquid state at ordinary temperature. The present invention has been accomplished on the basis of the above findings.

SUMMARY OF THE INVENTION

The present invention intends to provide a process for producing a compression molded article of a lignocellulose type article under high mold-releasing conditions.

The process of the present invention for producing a compression molded article of a lignocellulose type material by use of an organic polyisocyanate compound as a binder, the process which comprises carrying out adhesion by use of the following components:

(A) an organic polyisocyanate, (B) an aqueous emulsion of a wax having a melting point ranging from 50° C. to 160° C., (C) an organic phosphate ester derivative, and (D) optionally water.

In an embodiment of the present invention, the organic phosphate ester derivative is an alkanolamine salt of an aliphatic mono- and/or di-ester of phosphoric acid.

In another embodiment of the present invention, the organic phosphate ester derivative is prepared from a mono- and/or di-ester of phosphoric acid with an aliphatic alcohol having 12 to 20 carbons by neutralization with an alkanolamine.

In a further embodiment of the present invention, the components (A), (B), (C), and (D) are mixed in any order immediately before the application.

In a still further embodiment of the present invention, the component (A) is added to a mixture previously prepared from the components (B), (C) and (D) and the resulting mixture is uniformly mixed immediately before the application.

DESCRIPTION OF THE PREFERRED EMBODIMENTS

The polyisocyanate used in the present invention may be any organic polyisocyanate having two or more isocyanate groups in the molecule, including diphenylmethane diisocyanate, toluene diisocyanate, and hexamethylene diisocyanate. The term of "organic polyisocyanate" herein includes unmodified organic polyisocyanates and modified organic polyisocyanates. A preferred organic polyisocyanate in the present invention is a bifunctional or more functional polymethylene polyphenylene polyisocyanate produced by phosgenation of an aniline/formaldehyde condensate (hereinafter referred to as "polymeric MDI"): more preferred is a water-dispersible polymeric MDI having water dispersibility.

It is well-known that the water-dispersible polymeric MDI is prepared, for example, by reacting a polymeric MDI with a monofunctional hydroxyl-containing substance such as a hydrophilic alkoxypolyalkylene glycol having a number-average molecular weight ranging from about 250 to about 4000.

Japanese Patent Publication No. 2-58287 discloses such water-dispersible polymeric MDI which is commercially available as "WOOD CURE-300" [NCO-content =28.0% to 30.5% by weight : by Nippon Polyurethane Industry Co., Ltd.].

The organic polyisocyanate may be an isocyanate-terminated prepolymer derived by reaction of an organic polyisocyanate with a polyol. The preferable isocyanate-terminated prepolymer is prepared by the reaction of MDI and/or polymeric MDI with polyols having a number-average molecular weight ranging from 500 to 3000 and containing hydrophilic groups. These polyols include a polyether-polyol containing 50 mole % or more of ethylene oxide units; a polyester-, polycarbonate- and polyether- polyol having anionic-polar groups such as sulfonates ($-SO_3M$ wherein M is an alkali metal, quaternary organic amine and the like), carboxylates ($-COOM$ wherein M is an alkali methal, quaternary organic amine and the like) and the like. The preferable isocyanate-terminatated prepolymer may be a reaction product having an NCO-content of 20% to 30% by weight, which is obtained by the reaction of MDI and/or polymeric MDI and the polyether-polyols containing 50 mole % or more of ethylene oxide units.

It is preferable to use the water-dispersible polymeric MDI.

The aqueous emulsion of a wax used in the present invention is an aqueous emulsion of a known wax-type releasing agent of a melting point ranging from 50° C. to 160° C., including natural waxes such as montan wax, carnauba wax, rice wax, and paraffin wax; synthetic waxes such as polyethylene wax, montan wax derivatives, paraffin wax derivatives, hardened castor oil, and stearic amide. A conventional emulsifier is preferably used for the emulsification. The solid content of the emulsion is preferably in the range of from 10% to 50% by weight.

The organic phosphate ester derivative used in the present invention includes well-known water-soluble phosphate ester type internal releasing agents such as Zelec UN, a non-neutral phosphate salt alcohol produced by DuPont Co.; and MOLD WIZ INT-1858 and INT-1856, a phosphate ester type internal releasing agent produced by Axel Plastics Research Laboratories Co.

A higher mold-releasability and more satisfactory properties of the board are achievable by use of a phosphate produced by neutralization with an alkanolamine of partial phosphate ester produced from phosphoric acid and an aliphatic alcohol.

The aliphatic alcohol used may have 12 to 20 carbon atoms, including stearyl alcohol, and oleyl alcohol. The esterification of the phosphoric acid is preferably partial esterification to obtain a monoester, di-ester, or mixture thereof.

The partial phosphate ester is neutralized with an alkanolamine to use as a component of the composition according to the present invention. The neutralization need not be precise, and the stoichiometric ratio is in the range of from 0.3 to 3.0. Incomplete nuetralization by alkanoamine or the presence of excess of alkanolamine is tolerated. The alkanolamine for the neutralization includes monoethanolamine, diethanolamine, and triethanolamine. The organic phosphate ester derivative may be a solution in water or another solvent.

The lignocellulose type compression molded article is produced by spraying of the polyisocyanate composition to the lignocellulose type material and thermo-compressing the material. The molding can be conducted under any particle board molding conditions.

The organic polyisocyanate, the aqueous wax emulsion, and the phosphate ester derivative may be sprayed by use of a mixture formed immediately before the application, or separately onto the lignocellulose type material. Water may be optionally used in addition to the above three components.

The application of the components to the lignocellulose type material is carried out by uniformly spraying a mixture of the components (A), (B), (C) and optionally (D) to the lignocellulose type material in a batch mixer or continuous mixer.

Alternatively, the components (A), (B), (C) and (D) are separately sprayed on the ligunocellulose type material in a batch mixer or continuous mixer in any order. It is preferable to use the continuous mixture.

On the preparation of the mixture, the components (A), (B), (C) and (D) may be mixed in any order. However, it is preferable the component (A) is finally added. And it is preferable that the components (B) and (C) are previously mixed. It is preferable to use a mixture of the components (A), (B), (C) and (D).

In production in a continuous line, the aqueous wax emulsion and the phosphate ester derivative are preferably mixed before the application. This preliminarily mixture is further mixed continuously with water by a static mixer followed by mixing with the organic polyisocyanate. The resulting mixture is sprayed onto the lignocellulose type material.

U.S. Pat. Nos. 5,093,058, 5,188,785 and 5,200,267 disclose continuous processes and apparatus for the process.

The amounts of the components relative to the lignocellulose type material are respectively in the range of 5 to 20 parts by weight of the organic polyisocyanate, 0.5 to 4.0 parts by weight of solid matter of the aqueous wax emulsion, and 0.1 to 2.0 parts by weight of solid matter of the phosphate ester derivative based on 100 parts of the dry lignocellulose type material.

It is preferable to add water in order to keep a moisture content of mat prior to the compression at a constant value. The amount of water to be added is calculated from the difference between the amount of water required to a set value of moisture content of mat and an amount of water contained in the lignocellulose type material and emulsions. The moisture content of mat ranges 5 to 35% by weight, preferably 5 to 30% by weight.

By the process of the present invention, the adhesion of the material to the metal surface is prevented in thermo-compression molding of a lignocellulose type material such as wood chips, and wood fibers. Furthermore, the wax which is solid at an ordinary temperature can be handled in a uniform liquid emulsion state, advantageously.

The present invention is described by reference to Examples without limiting the invention. In Examples, the units, "parts" and "%", are based on weight respectively.

EXAMPLE 1

A preliminary mixture was prepared by mixing, by a laboratory mixer, 16.8 g of a montan wax emulsion, "MN-30" (solid content: 30%, Orion Kasei K.K.); 1 g of a phosphate ester derivative, "MOLD WIZ INT-1858" (solid content: 100%: Axel Plastics Research Laboratories Co.); and 35.9 g of distilled water.

To the resulting preliminary mixture 20.1 g of water-emulsifiable MDI, "WOOD CURE-300" (Nippon Polyurethane Industry Co., Ltd.) was added, and the composition A was obtained by thorough mixing, by a laboratory mixer.

To 100 parts of dried chips, 22.0 parts of the above composition A was blended to be thermo-compression molded under the molding conditions below.

The mold-releasability was checked by placing the iron panels "SPCC-SB" (Nippon Test Panel K.K.) on the both surfaces of the board.

[Molding Conditions]

Board size: 25cm ×25cm
Board thickness: 9 mm
Designed density: 0.700 g/cm$^3$
Water content of chips: 3%, lauan chip
Water content of product: 9%
Water content of mat: 16%
Compression temperature: 160° C.
Compression pressure: 30 kg/cm$^2$ (plate pressure)
Compression time: 12 sec per mm board thickness (108 sec)

As the results, the compression molded board could readily be released from the iron plates without adhesion of the chip to the iron plate. This board had a flexural strength of 288 kg/cm$^2$ according to JIS A 5908, and showed a thickness increase ratio of 6.2% on absorption of water according to JIS A 5901.

The same measurement methods were employed in the following Examples.

EXAMPLE 2

A preliminary mixture was prepared by mixing, by a laboratory mixer, 13.3 g of a carnauba wax emulsion, "BN-50" (solid content: 50%, Orion Kasei K.K.); 1.0 g of a phosphate ester derivative, "MOLD WIZ INT-1858" (solid content: 100%: Axel Plastics Research Laboratories Co.); and 41.0 g of distilled water.

To the resulting preliminary mixture 20.0 g of water-emulsifiable MID "WOOD CURE-300" (Nippon Polyurethane Industry Co., Ltd.) was added, and the composition B was obtained by thorough mixing, by laboratory mixer.

To 100 parts of dried chips, 22.6 parts of the above composition B was blended to be thermo-compression molded under the same molded under the same molding conditions as in Example 1.

The compression molded board could be released readily from the iron plates without adhesion of the chip to the iron plate. This board had a flexural strength of 288 kg/cm$^2$, and showed a thickness increase ratio of 6.4% on absorption of water.

EXAMPLE 3

The thermo-compression molding was conducted in the same manner as in Example 1 except that the water-emulsifiable MDI was replaced by a polymeric MDI, "Millionate MR300" (Nippon Polyurethane Industry Co. Ltd.).

The compression molded board could be released readily from the iron plates without adhesion of the chip to the iron plate. This board had a flexural strength of 287 kg/cm$^2$, and showed a thickness increase ratio of 6.2% on absorption of water.

EXAMPLE 4

The thermo-compression molding was conducted in the same manner as in Example 1 except that the phosphate ester derivative was replaced by a non-neutral phosphate salt alcohol, "Zelec UN" (solid content: 100%; DuPont Co.).

The compression molded board could be released readily from the iron plates without adhesion of the chip to the iron plate. This board had a flexural strength of 290 kg/cm$^2$, and showed a thickness increase ratio of 6.3% on absorption of water.

EXAMPLE 5

The thermo-compression molding was conducted in the same manner as in Example 1 except that the phosphate ester derivative was replaced by the one prepared by neutralizing 100 parts by weight of dioleyl phosphate with 25 parts by weight of triethanolamine (mole ratio=1:1).

The compression molded board could be released readily from the iron plates without adhesion of the chip to the iron plate. This board had a flexural strength of 320 kg/cm$^2$, and showed a thickness increase ratio of 5.0% on absorption of water.

Comparative Example 1

A preliminary mixture was prepared by mixing, by a laboratory mixer, 33.2 g of a montan wax emulsion, "MN-30" (solid content: 30%, Orion Kasei K.K.); and 24.5 g of distilled water.

To the resulting preliminary mixture 19.9 g of water-emulsifiable MID "WOOD CURE-300" (Nippon Polyurethane Industry Co., Ltd.) was added, and the composition F was obtained by thorough mixing, by laboratory mixer.

To 100 parts of dried chips, 23.4 parts of the above composition F was blended to be thermo-compression molded under the same molded under the same molding conditions as in Example 1.

The composition molded board could not be pulled apart from the iron plates owing to firm adhesion to the iron plates.

Comparative Example 2

A preliminary mixture was prepared by mixing, by a laboratory mixer, 19.9 g of a carnauba wax emulsion, "BN-50" (solid content: 50%, Orion Kasei K.K.); and 37.8 g of distilled water.

To the resulting preliminary mixture 19.9 g of water-emulsifiable MID "WOOD CURE-300" (Nippon Polyurethane Industry Co., Ltd.) was added, and the composition G was obtained by thorough mixing, by laboratory mixer.

To 100 parts of dried chips, 23.4 parts of the composition G was the blended. The mixture was thermo-compression molded under the same molding conditions as in Example 1.

The compression molded board could not be pulled apart from the iron plates owing to firm adhesion to the iron plates.

Comparative Example 3

A preliminary mixture was prepared by mixing, by a laboratory mixer, 1.0 g of a phosphate ester derivative, "MOLD WIZ INT-1858" (solid content: 100%: Axel Plastics Research Laboratories Co.); and 47.5 g of distilled water.

To the resulting preliminary mixture 20.4 g of water-emulsifiable MID "WOOD CURE-300" (Nippon Polyurethane Industry Co., Ltd.) was added, and the composition H was obtained by thorough mixing, by laboratory mixer.

To 100 parts of dried chips, 20.3 parts of the above composition H was blended. The mixture was thermo-compression molded under the same molding conditions as in Example 1.

The compression molded board could not be pulled apart from the iron plates owing to firm adhesion to the iron plates.

Comparative Example 4

A preliminary mixture was prepared by mixing, by a laboratory mixer, 3.4 g of a phosphate ester derivative, "MOLD WIZ INT-1858" (solid content: 100%: Axel Plastics Research Laboratories Co.); and 47.6 g of distilled water.

To the resulting preliminary mixture 20.4 g of water-emulsifiable MID "WOOD CURE-300" (Nippon Polyurethane Industry Co., Ltd.) was added, and the composition J was obtained by thorough mixing, by laboratory mixer.

To 100 parts of dried chips, 21.1 parts of the above composition J was added. The mixture was thermo-compression molded under the same molded under the same molding conditions as in Example 1.

The thermo-compression molded board could be released readily from the iron plates without adhesion of the chip to the iron plate. This board had a flexural strength of 272 kg/cm$^2$, and showed a thickness increase ratio of 18.3% on absorption of water. The water resistance of the board was significantly lower than that of Examples 1 to 3.

Comparative Preparation Example 1

In 50-mL sample bottle, were placed 7.5 g of montan wax of a melting point of 75° C. to 85° C., and 12.5 g of 2-ethylhexyl diphenylphosphate, and were heated up to 95° C. to form a solution. After formation of a homogeneous solution at this temperature, the heating was stopped, and the solution was left standing to cool spontaneously. At about 50° C. to 60° C., the solution lost the fluidity. At ordinary temperature, the solution had no fluidity at all.

What is claimed is:

1. A process for producing a compression molded article of a lignocellulose type material by use of an organic polyisocyanate compound as a binder, the process which comprises carrying out adhesion by use of the following components:

(A) an organic polyisocyanate,
   (B) an aqueous emulsion of a wax having a melting point ranging from 50° C. to 160° C.,
   (C) an organic phosphate ester derivative, and
   (D) optionally water.

2. The process according to claim 1, wherein the organic phosphate ester derivative is an alkanolamine salt of an aliphatic mono- and/or di-ester of phosphoric acid.

3. The process according to claim 1, wherein the organic phosphate ester derivative is prepared from a mono- and/or di-ester of phosphoric acid with an aliphatic alcohol having 12 to 20 carbons by neutralization with an alkanol amine.

4. The process according to claim 1, wherein the component (A) is a unmodified organic polyisocyanate or a modified organic polyisocyanate.

5. The process according to claim 1, wherein the components (B) and (C) are used as a mixture thereof.

6. The process according to claim 1, wherein the components (A), (B), (C) and (D) are mixed in any order immediately before the application.

7. The process according to claim 6, wherein components (B) and (C) are mixed, followed by incorporation of the component (A).

8. The process according to claim 6, wherein the component (A) is added to the mixture previously prepared from the components (B), (C) and (D) and the final mixture is uniformly mixed immediately before the application.

* * * * *